United States Patent [19]
Atchley

[11] Patent Number: 4,807,567
[45] Date of Patent: Feb. 28, 1989

[54] INVERTED BOTTLE WATER DISPENSER FOR LARGE ANIMALS

[76] Inventor: Frank W. Atchley, 461 Walnut St., Napa, Calif. 94558

[21] Appl. No.: 29,235

[22] Filed: Mar. 23, 1987

[51] Int. Cl.$^4$ ............................................. A01K 31/00
[52] U.S. Cl. .................................... 119/18; 119/72.5; 211/106; 248/311.3
[58] Field of Search ................. 119/18, 72.5; 248/302, 248/311.3, 312, 313; 211/88, 106

[56] References Cited

U.S. PATENT DOCUMENTS

| 1,645,392 | 2/1980 | Nash | 248/72.5 X |
|---|---|---|---|
| 3,251,342 | 5/1966 | Kay | 119/72.5 |
| 3,529,575 | 9/1970 | Schalk | 119/72.5 |
| 3,589,338 | 6/1971 | Lovitz | 119/72.5 X |
| 3,752,124 | 8/1973 | Gabriel | 119/72.5 |
| 3,780,972 | 12/1973 | Broderson | 211/88 X |
| 4,022,159 | 5/1977 | Salvia | 119/72.5 X |
| 4,188,914 | 2/1980 | Lage | 119/72.5 X |

Primary Examiner—Robert P. Swiatek
Assistant Examiner—Thomas Price
Attorney, Agent, or Firm—Harris Zimmerman; Howard Cohen

[57] ABSTRACT

A somewhat flattened inverted water bottle has oppositely slanted surfaces at the lower end which face away from each other. An inverted cap engages at a mouth opening in one of the surfaces and has a water dispensing tube which extends outwardly and downwardly from that surface. The bottle seats in an open centered angled seat portion of a support frame which has segments that extend under the bottle at each side of the cap in contact with the slanted surfaces. A pivotable bail clasps an upper region of the bottle against the frame. Clamp elements enable quick securing of the dispenser to any of a variety of upright surfaces which may be of either mesh or solid construction. The bottom may be seated in either of two opposite orientations at one of which the dispensing tube extends backwardly into an opening in the supporting structure and at the other of which the tube extends outwardly from the supporting structure.

11 Claims, 3 Drawing Sheets

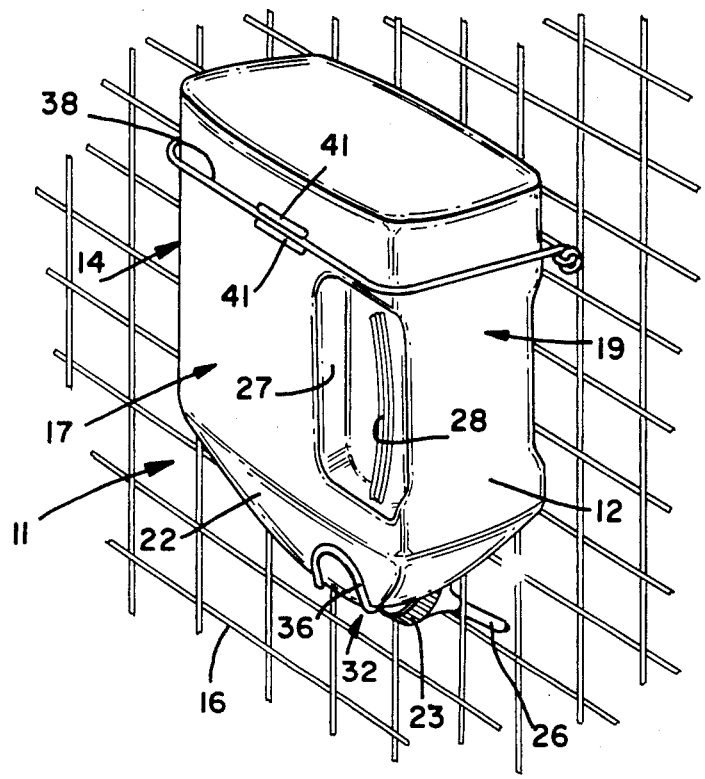
FIG_1
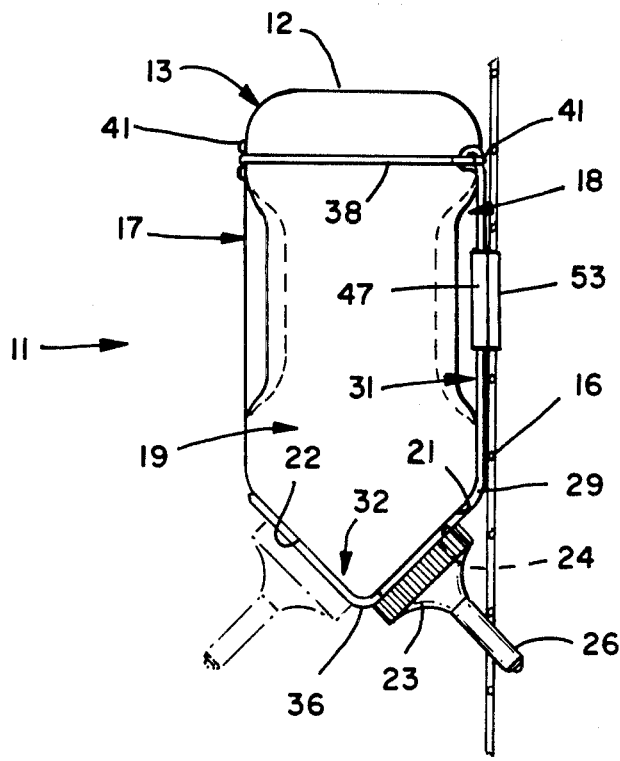
FIG_2

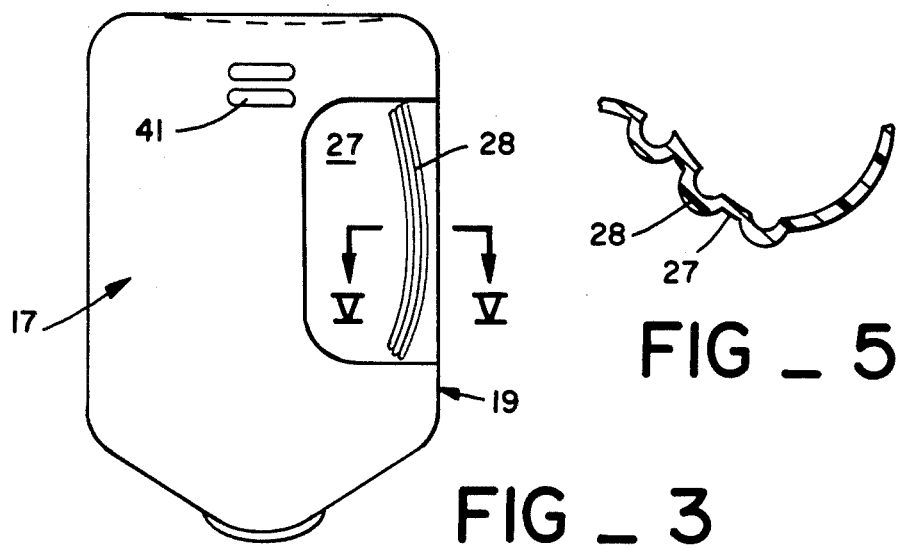
FIG_3
FIG_5
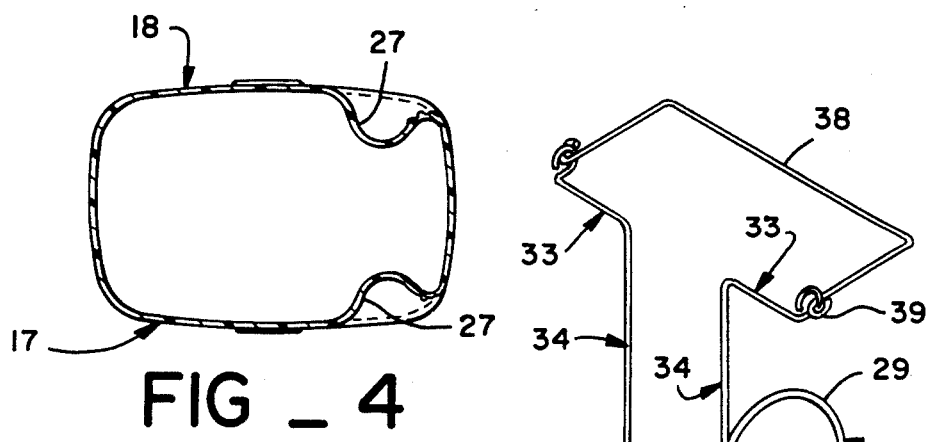
FIG_4
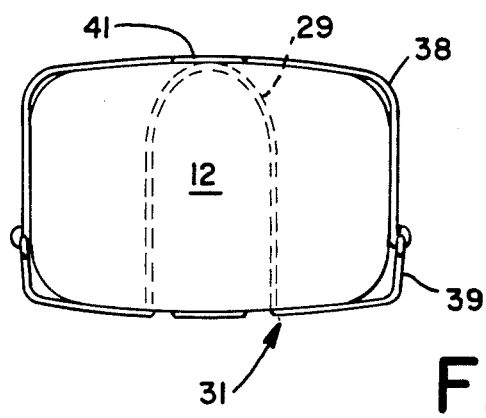
FIG_6
FIG_7

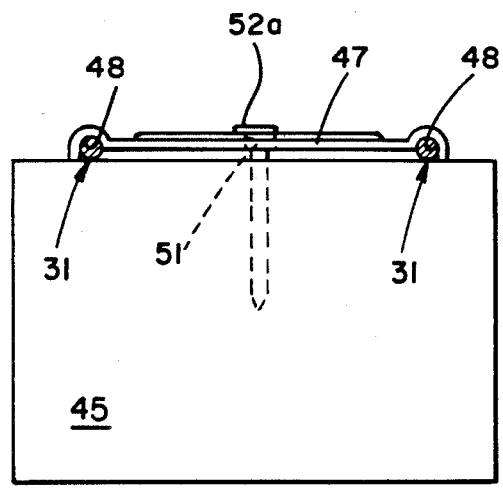
FIG _ 10
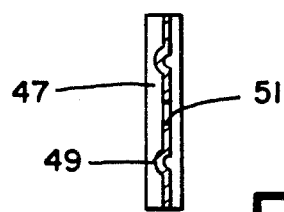
FIG _ 9
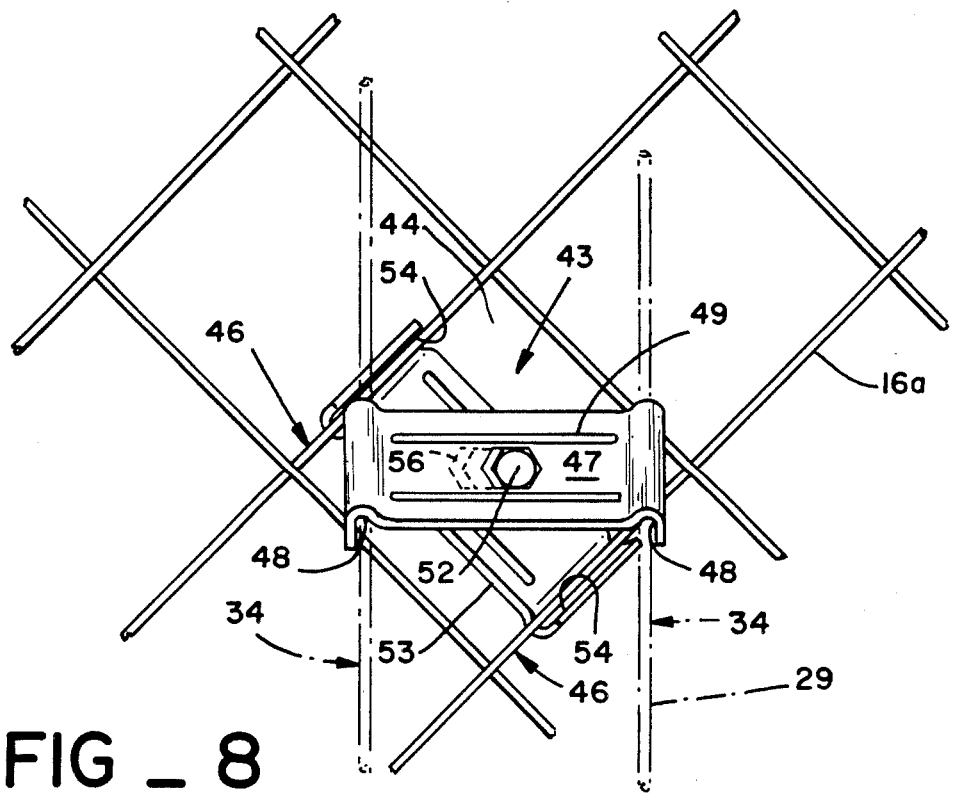
FIG _ 8

INVERTED BOTTLE WATER DISPENSER FOR LARGE ANIMALS

TECHNICAL FIELD

This invention relates to water dispensers for animals and more particularly to water bottles of the type which are supported in an inverted position and which have an outlet tube at the bottom through which an animal may obtain drinking water.

BACKGROUND OF THE INVENTION

Inverted water bottles having a dispensing tube extending from the lowermost portion are used by pet owners and in zoos, biological laboratories and the like to provide water to caged animals. Gravitational pull on the water creates a partial vacuum at the upper region of the bottle that prevents outflow through the tube. The animal obtains water by licking, nuzzling or pecking at the outlet of the tube.

Water dispensers of the above described kind have a number of advantages over an open water dish. The water in such a dispenser is less subject to fouling and contamination by the activities of the animal. this can be particularly important in the case of very young animals whose natural immunities to bacterial and viral diseases are not yet fully developed. Unlike a water dish, the inverted water bottle can be mounted on the outside wall of a cage. This avoids spillage by the activities of the animal and provides for more free space within the cage. The dispenser can be refilled without opening the cage which is a convenience and which can greatly reduce problems in tending for aggressive or hazardous animals.

The conventional animal water bottle was originally designed primarily for caged small animals such as rodents or small birds for example. The conventional construction of the bottle and its support structure is subject to problems when used for water larger animals such as dogs, cats or poultry for example. In the typical conventional construction the bottle is supported in part by the dispensing tube which extends into one of the openings in the mesh wall of the cage and rests on one of the wires of the mesh. The other support element of a typical prior construction is a wire or band which extends around an upper portion of the bottle and has ends hooked or otherwise engaged with the wires of the cage wall.

The above described prior construction must necessarily be located on a mesh wall and at the opposite side of the wall from the animal. Attachment structure for mounting the bottle at some other locations can be contrived but this is at best a considerable inconvenience. It would be advantageous if the water dispenser, as manufactured, was more readily adaptable to different locations and orientations and to attachment to different types of walls, fences, posts or other structures. Larger animals such as dogs, cats or poultry for example are often not kept in mesh cages. Such animals may be confined only by fences of any of a variety of types or by solid walls or may not be confined at all. If there is in fact a mesh fence available on which the water bottle can be mounted, the opposite side of the fence may not be readily accessible to the animal owner.

The above described prior construction also does not provide a desirably secure attachment of the bottle to the mesh wall. Larger animals may be capable of misorienting the bottle or dislodging it from the mesh wall.

Enlargement of the above described prior water dispenser assembly to meet the needs of larger animals also causes the device to project further out from the cage wall. This can be disadvantageous in situations where a cage or a number of cages are kept in constricted locations.

The present invention is directed to overcoming one or more of the problems discussed above.

SUMMARY OF THE INVENTION

In one aspect of the present invention, apparatus for dispensing water or other liquids to animals includes a bottle which is broader in one direction than in an orthogonal direction and which has a water dispensing tube extending outwardly from the lower end of the bottle in the orthogonal direction. A support frame has a hook shaped open centered seat portion in which the lower end of the bottle is received and seated and which extends under the bottle in the orthogonal direction at each side of the water dispensing tube. The support frame has a back portion which extends upward from the seat portion to an upper region of the bottle. A bail member has ends pivotably coupled to the back portion of the frame adjacent the upper region of the bottle, the bail member being proportioned to clasp the upper region of the bottle against the back portion of the frame and is pivotable in an upward direction to enable separation of the bottle from the frame. Means are provided for securing the back portion of the frame to an upright structure.

In another aspect of the invention, the apparatus includes means for enabling seating of the bottle in the support frame in a selected one of two opposite orientations, the dispensing tube being positioned to extend into an opening in the upright structure at one of the orientations and being positioned to extend outwardly relative to the upright structure at the other of the orientations.

In another aspect, the invention provides apparatus for dispensing water or other liquid to an animal which includes an inverted water bottle with a lowermost portion defined in part by first and second intersecting surfaces which are angled with respect to each other and which face away from each other, the bottle having a mouth opening at the first surface. A removable inverted cap is engaged on the bottle at the mouth opening and has a water dispensing tube which extends outwardly and downwardly from the first surface. A support frame has a pair of end segments which extend horizontally in co-linear relationship along an upper region of the bottle, a pair of spaced apart back segments which extend down along the bottle from the end segments, a pair of angled seat segments which slant downwardly from the back segments beneath one of the surfaces and slant upwardly beneath the other of the surfaces, the seat segments being spaced apart sufficiently to receive the inverted cap between the seat segments, and a center segment bridging the ends of the seat segments that are remote from the back segments. A bail member clasps the upper region of the bottle and has ends pivotably coupled to the end segments of the frame to enable upward pivoting of the bail member from the bottle. Means are provided for securing the support frame to an upright structure.

The invention provides the sanitation, space savings and ease of maintenance of bottle type water dispensers in a construction more suited to the needs of larger animals. The dispenser can be quickly, easily and securely fastened to any of a variety of structures including mesh cages, fences of either mesh or solid material, building walls or posts, for example. The bottle may be positioned in either of two opposite orientations at one of which the water dispensing tube extends inward into an opening in the supporting structure and at the other of which the tube extends outward from the supporting structure. The bottle is preferably somewhat flattened and is tightly held against the supporting structure providing a high degree of compactness in relation to the water holding capacity.

BRIEF DESCRIPTION OF THE DRAWINGS

FIG. 1 is a perspective view of an animal water dispenser in accordance with one embodiment of the invention shown mounted on a mesh wall.

FIG. 2 is a side view of the water dispenser of FIG. 1.

FIG. 3 is an elevation view of the bottle component of the water dispenser.

FIG. 4 is a plan section view of the bottle component of the water dispenser.

FIG. 5 is a section view of a portion of the bottle taken along line V—V of FIG. 3.

FIG. 6 is a perspective view of a support frame component of the water dispenser.

FIG. 7 is a top view of the bottle and support frame in the assembled condition.

FIG. 8 is an elevation view of clamp components as adapted to attach the water dispenser to an open mesh having diagonally oriented wire strands.

FIG. 9 is a cross section view of one of the clamp members of the preceding figure.

FIG. 10 is a top view of one of the clamp members as utilized to fasten the water dispenser to a solid upright post.

DETAILED DESCRIPTION OF THE PREFERRED EMBODIMENT

Referring to FIGS. 1 and 2 of the drawings in conjunction, an animal water dispenser in accordance with this embodiment of the invention includes an inverted bottle 12. Bottle 12 preferably has a substantially rectangular shape with rounded corners 13 and wall intersections 14 and is preferably broader in one direction than in the orthogonal direction in order to have a desirably high water holding capacity without protruding outward from the supporting structure 16 for an excessive distance.

The bottle 12 may advantageously be formed of lightweight plastic in which case it is preferable that the two larger walls 17 and 18 and the sidewalls 19 bow outward slightly to resist inward flexing from the negative pressure that occurs in an inverted water bottle.

The lowermost portion of the bottle 12 has intersecting slanted first and second surfaces 21 and 22 which face away from each other. An inverted threaded cap 23 engages on a threaded mouth opening 24 in the first surface 21 and a linear water dispensing tube 26 extends outwardly and downwardly from the cap along the axis of the cap. The lower end of the tube 26 is provided with a liquid dispensing device adapted to respond to an animal seeking water or other liquid from the water dispenser. A preferred form of dispenser is the Demand Delivery Oval Ball Pump Liquid Dispenser disclosed in U.S. Patent application Ser. No 06/875,963, filed June 19, 1986, which will soon issue into a U.S. Patent. Other equivalent devices may also be used.

Refering jointly to FIGS. 3 and 4, matching indentations 27 are formed in the two larger walls 17 and 18 at corresponding locations close to one of the sidewalls 19 to facilitate gripping of the bottle 12 by a person's hand. Referring to FIGS. 3 and 5 in conjunction, vertically extending corrugations 28 are provided within each such indentations 27 to further facilitate gripping of the bottle 12.

Referring again to FIGS. 1 and 2 in conjunction, bottle 12 seats in a support frame 29 which has back portion 31 that extends downward from an upper region of the bottle. An angled open centered seat portion 32 of the frame 29 extends from the back portion 31 underneath the bottle at each side of cap 23 and has a hooked V-shaped profile conforming to the slanted undersurfaces 17 and 18 of the bottle 12.

Referring now to FIG. 6, the support frame 29 may be an angled continuous length of rod or stiff wire having end segments 33 which are co-linear and which extend in opposite directions from the tops of spaced apart parallel vertical back segments 34. Angled seat segments 36 slant downwardly and outwardly from the lower ends of the back segments 34 and then slant upwardly and outwardly to provide a seat of the hereinbefore described V-shaped profile. The central segment 37 of the frame 29 is curved to bridge the spaced apart seat segments 36 at the front of the frame 29, the center segment and adjacent portions of the seat segments being coplanar.

A U-shaped bail member 38 has ends pivotably coupled to the ends of the frame end segments 33 such as by mans of interlocking loops 39 formed on the ends of the bail member and frame, the bail member being pivotable in an upward direction. Referring now to FIG. 7, bail member 38 is proportioned to fit around the upper region of bottle 12 and to clasp the bottle against the back portion 31 of frame 29.

Referring again to FIGS. 1 and 2 in conjunction, a pair of vertically spaced apart detent protruberances 41 are located on each of the larger walls 17 and 18 of bottle 12 in position to hold bail member 38 in place when the bail member is clasping the bottle against back portion 31 of frame 29. The bail member 38 may be snapped into engagement with detent protuberances 41 and may be disengaged from the protuberances by application of sufficient force as the bottle material is slightly resilient.

Seat segments 36 of frame 29 are spaced apart sufficiently to enable the cap 23 to fit between the two seat segments when bottle 12 is seated in the frame.

The above described construction of the bottle 12 and frame 29 enables the bottle to be seated in a selected one of two opposite orientations depending on the conditions under which it is to be used. In one orientation cap 23 and tube 26 extend downwardly and backwardly from frame 29 into one opening in the supporting structure 16, as shown in FIGS. 1 and 2. This orientation is appropriate, for example, where the animal is confined in a mesh walled cage or by a mesh fence and the bottle is to be refillable without entering the cage or fenced enclosure.

In the other orientation, bottle 12 is turned 180° before being seated and the cap 23 and tube 26 extend outwardly and downwardly from the front of frame 29 as shown in phantom line in FIG. 2. This orientation is appropriate, for example, when the back of the supporting structure 16 is not accessible or when the supporting structure is a solid wall, and upright post or the like.

In either orientation, the oppositely slanted undersurfaces 21 and 22 of bottle 12 and the conforming configuration of the seat portion 32 of frame 29 create a wedging action which immobilizes the bottle relative to the frame. Cap 23, fitting between the seat segments 36 of the frame 29, prevent sideward movement of the bottle 12. Bail member 38, retained by detent protuberances 41, tightly clasps the upper region of the bottle 12 against the back portion 31 of the frame. Thus the bottle 12 is rigidly and securely held by the frame 29.

Referring jointly to FIGS. 8 and 9, means 43 are provided for quickly, easily and securely fastening the support frame 29 to an upright structure 16a which in this example is a woven wire mesh of the type having openings 44 bounded at opposite sides by parallel wire segments 46 which extend at a 45° angle relative to vertical. To facilitate attachment to any of a variety of different upright structures 16a, means 43 may include a clamp member 47 proportioned to span the spaced apart back segments 34 of the support frame 29 between the back segments and the bottle 12. Each end of the clamp member 47 is angled and shaped to define a vertical groove 48 which receives and partially encloses a portion of one of the two frame back segments 34. Stiffener ribs 49 extend along the clamp member 47 and a passage 51 transpierces the clamp member at the center to receive a fastening device 52 which is a bolt in this example but which may also be a screw, nail or the like depending on the type of supporting structure 16a that the clamp member is to be fastened to.

The water dispenser 11 is mounted on an open mesh 16a by disposing an additional clamp member 53 at the inside of the mesh 16a to span two opposite ones of the wore segments 46 that bound opening 44 of the mesh. The additional clamp member 53 has a groove 54 at each end which partially encloses a portion of one of the mesh wire segments 46. Fastening device 52 extends through the center passages 51 of both clamp members 47 and 53 and a nut 56 is engaged on the fastening device to hold the two members together and thereby provide a positive attachment of the water dispenser 11 to the supporting structure 16a. In this example, clamp member 53 is oriented at a 45° angle relative to clamp member 47 to accomodate the diagonal alignment of the mesh segments 46. Referring now to FIG. 2, the clamp members 47 and 53 may be in parallel relationship when the mesh 16 is composed of horizontal and vertical wire segments.

Referring again to FIG. 8, the two clamp members 47 and 53 are of equal length and identical configuration in this example but longer or shorter inner clamp members 53 may be provided to accomodate to meshes 16a having differently sized openings 44.

Although it is not essential in all cases, it is advantageous if the spacing of the centerlines of the support frame back segments 34 conforms with the spacing of the centerlines of the wire segments 46 of the most common used standardized chain link fencing for confining dogs in residential yards, kennels or the like which spacing is 2.186 inches. This enables the two clamp members 47 and 53 to be identical, which is a manufacturing economy, while being suitable for a sizable proportion of the installation of the apparatus. As pointed out above, clamp members 53 of different sizes can be provided when needed to accomodate to meshes having different sized openings.

Referring now to FIG. 10, a single one of the clamp members 47 may be used to mount the apparatus on a wood post 45, solid wall or the like. The support frame back portions 31 are entered into grooves 48 as previously described and the clamp member 47 is then fastened to the post 45 or the like by driving a nail 52a into the post through the center passage 51 of the clamp member.

Referring again to FIGS. 1 and 2, after mounting of the support frame 29 on the supporting structure 16 bottle 12 is filled, inverted and seated in the frame by temporarily lifting the bail member 38 and then engaging the bail member between detents 41 to latch the bottle in place. The frame 29 then holds bottle 12 flat against the supporting structure with tube 26 extending either forwardly or backwardly depending on what is appropriate at the particular installation. The bottle 12 is immobilized and cannot be shifted or dislodged by the activities of the animal.

While the invention has been described with respect to a particular example, many modifications are possible and it is not intended to limit the invention except as defined in the following claims.

I claim:

1. An apparatus for dispensing water or other liquids to animals, comprising:

a bottle for storing said water or other liquid, said bottle having a vertical extent and a vertical axis, a water dispensing tube extending obliquely downwardly and outwardly from the lower end of said bottle, a support frame having a hook shaped open centered seat portion in which the lower end of said bottle is received and seated, said support frame having a back portion which extends upward from said seat portion along said bottle to an upper region thereof, said seat portion including a first opening through which said water dispensing tube may extend through said back portion and a second opening, opposed to said first opening, through which said water dispensing tube may extend away from said back portion, said bottle including surface configuration means adapted to seat in said seat portion in either of two angular orientations about said vertical axis, the first of said two angular orientations including said water dispensing tube extending through said first opening, and the second of said two angular orientations including said water dispensing tube extending through said second opening in said seat portion, a bail member having ends pivotally coupled to said back portion of said support frame adjacent to said upper region of said bottle, said bail member being proportioned to clasp said upper region of said bottle against said back portion of said support frame and being pivotable in an upward direction to enable separation of said bottle from said support frame, and means for securing said back portion of said frame to an upright structure.

2. The apparatus of claim 1 wherein said lower end of said bottle has a V-shaped profile with oppositely slanted surfaces which face away from each other and wherein said bottle has a mouth opening located in one of said slanted surfaces, further including a removable closure cap engaged on said bottle at said mouth thereof, said water dispensing tube being secured to said cap and being oriented to extend outwardly and downwardly from said cap and one of said slanted surfaces of said bottle, and wherein said seat portion of said support frame is angled in conformity with said V-shaped configuration of said lower end of said bottle and has an open area at the center which is sufficiently large to enable seating of said bottle in a first orientation where said cap extends into said open area and said tube extends under said back portion of said frame and also to enable seating of said bottle in a reversed orientation in which said cap extends into said open area and said tube extends away from said back portion of said frame.

3. The apparatus of claim 2 wherein said support frame is defined by a continuous length of rod having spaced apart vertical segments defining said back portion of said frame and having spaced apart angled seat segments, each extending integrally from one of said vertical segments and extending under said lower end of said bottle at each side of said cap and a central segment extending integrally between opposed end portions of said seat segments at a front portion of said frame disposed in opposition to said back portion of said frame.

4. The apparatus of claim 3 wherein said rod has end segments which extend sidewardly in opposite directions from the tops of said back segments, said bail member including end portions being pivotably attached to said end segments of said rod.

5. The apparatus of claim 3 wherein said means for securing said back portion of said frame to an upright structure includes a first clamp member spanning said back segments of said rod and having a pair of spaced apart vertical grooves into which portions of said back segments are fitted, said first clamp member having a passage therethrough at a location between said grooves, and a fastening device extending through said passage for securing said first clamp to said upright structure.

6. The apparatus of claim 5 wherein said upright structure is a mesh having openings bounded at opposite sides by parallel wire segments, further including a second clamp proportioned to span a pair of said parallel wire segments and having a pair of parallel grooves spaced apart a distance corresponding to the spacing of said wire segments, and wherein said fastening device secures said first and second clamps against each other.

7. The apparatus of claim 6 wherein said back segments of said frame are spaced apart a distance similar to the spacing of said pair of wire segments of said mesh, and wherein said first and second clamps have substantially the same configuration.

8. The apparatus of claim 1 wherein said bottle has first and second resilient walls which are spaced apart in said orthogonal direction, further including a first detent protuberance located on said first wall to engage said bail member and resist upward pivoting thereof when said bottle is positioned with said second wall adjacent said back portion of said frame, and a second detent protuberance located on said second wall to engage said bail member and resist upward pivoting thereof when said bottle is positioned with said first wall adjacent said back portion of said frame.

9. The apparatus of claim 1 wherein said bottle has first and second walls which are spaced apart in said orthogonal direction, each of said walls having a handle defining indentation at similar locations on the two walls.

10. The apparatus of claim 1 wherein said bottle has first and second larger walls which are spaced apart in said orthogonal direction and has smaller sidewalls spaced apart in said one direction and extending between said first and second larger walls, wherein the intersections of said larger walls and said sidewalls are rounded and each of said larger walls and sidewalls is outwardly bowed.

11. Apparatus for dispensing water or other liquid to an animal comprising:
   an inverted bottle having a lowermost portion defined in part by first and second intersecting surfaces which are angled with respect to each other and which face away from each other, said bottle having a mouth opening at said first intersecting surface,
   a removable inverted cap engaged on said bottle at said mouth opening thereof, said cap having a water dispensing tube which extends outwardly and downwardly from said first intersecting surface,
   a support frame having a pair of end segments which extend horizontally in co-linear relationship along an upper region of said bottle, a pair of spaced apart back segments which extend down along said bottle from said end segments, a pair of angled seat segments which slant downwardly from said back segments beneath one of said intersecting surfaces and which slant upwardly beneath the other of said intersecting surfaces, said seat segments being spaced apart sufficiently to receive said inverted cap therebetween, and a center segment bridging the ends of said seat segments that are remote from said back segments,
   a bail member clasping said upper region of said bottle and having ends pivotably coupled to said end segments of said support frame to enable upward pivoting of said bail member from said bottle, and
   a clamp member spanning said back segments of said frame between said bottle and said frame and having means for securing said frame to an upright structure.

* * * * *